United States Patent [19]

Mastronardo

[11] Patent Number: 4,838,421
[45] Date of Patent: Jun. 13, 1989

[54] MULTIPLE USE CASSETTE CARRYING CASE

[75] Inventor: Patrick Mastronardo, Stamford, Conn.

[73] Assignee: Lebo Peerless, Inc., Bloomfield, N.J.

[21] Appl. No.: 293,568

[22] Filed: Jan. 3, 1989

Related U.S. Application Data

[63] Continuation of Ser. No. 868,265, May 29, 1986, abandoned.

[51] Int. Cl.⁴ ............................................. B65D 85/672
[52] U.S. Cl. ..................................... 206/387; 190/110
[58] Field of Search .................. 206/387; 190/110; 211/40, 41

[56] References Cited

U.S. PATENT DOCUMENTS

| | | | |
|---|---|---|---|
| 3,567,063 | 3/1971 | Kovach | 206/387 |
| 3,710,900 | 1/1973 | Fink | 190/110 |
| 3,856,369 | 12/1974 | Commiant | 206/387 |
| 4,273,223 | 6/1981 | Tomlinson | 190/110 |
| 4,293,075 | 10/1981 | Veralrud | 206/387 |
| 4,407,411 | 10/1983 | Lowry | 206/387 |
| 4,432,453 | 2/1984 | Berkman | 206/387 |
| 4,433,780 | 2/1984 | Ellis | 206/387 |
| 4,506,769 | 3/1985 | Franco et al. | 190/110 |

Primary Examiner—Joseph Man-Fu Moy
Attorney, Agent, or Firm—Marvin Feldman

[57] ABSTRACT

A multiple use cassette carrying case has an injection molded rigid cassette tray which is grippingly received in a rectilinear recess formed in a flexible case, with the fabric case cover zipper enclosing the tray in the carrying case. The cassette carrying case is a durable, self-supporting construction, without the need for stiffening and supporting materials. With the tray removed the fabric case serves as a utility case and the tray is an independent cassette storage tray. The tray is designed for large volume storage of both foxed and unboxed cassettes. The tray features inner partitions, and ribs for the mounting of either boxed or unboxed cassettes in box-like compartments. The cassette carrying case is useful for the storage of either audio or video cassettes, or other types of cassettes, i.e. magnetic tape enclosures in general.

26 Claims, 3 Drawing Sheets

MULTIPLE USE CASSETTE CARRYING CASE

This is a continuation of co-pending application Ser. No. 868,265 filed on May 29, 1986.

FIELD OF THE INVENTION

This invention relates to carrying cases for magnetic tape enclosures such as boxed and unboxed audio cassettes.

BACKGROUND AND DISCUSSION OF THE PRIOR ART

Initially storage cases for magnetic tape cassettes and their boxes were formed essentially of injection molded constructions, such as is disclosed in Kryter, U.S. Pat. No. 3,756,383, granted Sept. 4, 1973. Such prior art constructions required thick molded sections that were costly and difficult to produce.

Another early design is shown in Liber, U.S. Pat. No. 3,830,363, granted Aug. 20, 1974, which disclosed ribs disposed at 90° for alternatively receiving differently sized cassettes.

More recent prior art constructions sought to minimize costs by utilizing thin vacuum formed cassette trays, which were affixedly glued into reinforced vinyl carrying cases. While this approach reduced costs, the carrying cases were not aesthically acceptable and the vacuum formed trays were relatively fragile. Further, the vacuum formed trays were generally limited to relatively small sized constructions.

Another more recent prior art attempt at a successful carrying case was the glued-in-place construction of a vacuum formed cassette tray in a fabric case. Cardboard stiffening inserts were required to be inserted in between the vacuum formed tray and the fabric case sides, with the glue applied between the cardboard and the tray in an attempt to maintain an integral structure. Molded rigid cassette trays were fitted within fabric cases with the intention of maintaining a permanent fit. The fabric cases were not pocketed and did not serve as separate utility carrying cases.

In addition to the aforesaid disadvantages, the prior art carrying cases were limited to a single function, namely the carrying of cassettes or cassette boxes and served no further usefulness.

OBJECTS OF THE INVENTION

A principal object of the present invention is to provide a novel cassette carrying case which overcomes the afore-discussed problems in prior art constructions.

It is a further object of the present invention to provide a carrying case which can serve both as a cassette storage and carrying case or as a utility carrying case.

It is another object of the present invention to provide a strong self-supporting cassette carrying case which is free of reinforcing or stiffening sheet materials.

It is another object of the present invention to provide a cassette carrying case with a cassette tray construction that readily accommodates a high number of boxed and unboxed cassettes.

It is still a further object of the present invention to provide a carrying case as aforesaid which is of readily washable fabric construction.

It is still another object of the present invention to provide a readily and yet inexpensively manfactured cassette carrying case of practical design and function, and yet durable in extensive use.

These and other objects and advantages of the present invention will become evident from the description which follows.

SUMMARY OF THE INVENTION

A carrying case is formed of a flexible fabric case with the sides and bottom of the case forming a rectilinear recess, and an injection molded rigid cassette storage tray is frictionally engaged along the sides of the case into the recess to form a self-supporting cassette carrying case. With the plastic storage tray removed, the case is a readily washable fabric utility case, and the tray is separately useful for the storage of boxed and unboxed cassettes. The storage tray is of specifically ribbed wall construction with partitions or inner walls, to provide a durable construction for the storage of either boxed or unboxed cassettes in box-like compartments.

The fabric/plastic tray carrying case is free of reinforcing sheet materials or adhesive materials.

The present invention is characterized by the provision of a multiple use rectangular parallelepired cassette carrying case including a hollow fabric cover case and an inner ridgid molded plastic tray. The case has a generally rectangular bottom wall and rectangular side walls, with the case bottom wall and side walls forming a recess., The tray has a bottom wall and side walls, so that the tray is removably insertable into the recess in the case, with the fabric of the case grippingly frictionally engaging the side walls of the tray. The inner surfaces of the side walls of the tray are provided with a first plurality of integral protruding ribs. At least one integral inner partition or wall is provided within the tray, and in registration with and spaced from at least one side wall of the tray. The partition or wall extends upwards perpendicular to the bottom wall of the tray. The partition or wall is provided with a second plurality of integral protruding ribs. Thus, a cassette including magnetic tape enclosures is receivable in the tray, and between the partition and the at least one side wall, with the first and second plurality of ribs grippingly engaging the cassette. The first and second plurality of ribs are rectilinear and extend upwards perpendicular to the bottom wall of the tray.

Typically, a plurality of inner partitions is provided within the tray, at least two of the inner partitions being disposed perpendicular to each other, so as to form pairs of opposed inner walls.

Cassettes such as audio or video cassettes are used in service in an unboxed form. For storage or shipment, the cassettes are contained in clear plastic boxes or carrying cases. This, in the present invention, the tray of the cassette carrying case is preferably provided with first opposed pairs of adjacent ribs which are spaced so as to receive an unboxed cassette, and second opposed pairs of adjacent ribs which are spaced so as to receive a boxed cassette. Typically, the first ribs are formed with radially outwardly extending curved ends, to engage the sides of the unboxed cassette. The second ribs are formed with an upwardly extending taper, from a wider lower base to a successively diminished thickness dimension in an upwards direction, so that the space between adjacent second ribs at the bottom wall of the tray slidably receives the sides of the boxed cassette.

The fabric cover case generally includes a fabric cover integrally formed with one fabric side. A second fabric piece is provided, together with means to connect the second fabric piece to the fabric side. The fabric side is formed with an opening, so that the fabric side and the second fabric piece form a pocket in the fabric cover. Usually, a zipper is provided for closing the cover pocket. Also, generally the case is formed with a zippered closure.

In a preferred embodiment, the cassette carrying case is characterized by the provision of a first set of opposed fabric case and tray sides which is substantially longer than the second set of opposed fabric case and tray sides. Thus, an elongated structure is formed. The inner partitions support the elongated structure, with the inner partitions forming a plurality of box-like compartments.

Usually the fabric case consists essentially of a flexible fabric material, the case being free of stiffening or supporting materials. Generally the case includes a strap, the strap being connected to sides of the fabric case, usually together with means such as a Velcro attachment to disconnectably connect the strap to the case.

In a preferred embodiment, the first ribs terminate short of the top of the partition. Also, generally each of the second ribs is attached to the partition by a rectilinear cylindrical post, formed at the base of the second rib. Finally, preferably at least two of the partitions are transverse and perpendicular to each other, and a rectilinear cyclindrical post is formed at the junction of the two partitions.

The invention accordingly consists in the features of construction, combination of elements, and arrangement of parts, which will be exemplified in the device and article of manufacture hereinafter described, and of which the scope of application is as elucidated supra and as will be indicated in the appended claims.

DISCUSSION OF THE PREFERRED EMBODIMENTS

Referring to FIGS. 1–5, there is shown the carrying case of the present invention generally referred to as 10. Case 10 is composed of essentially a two piece construction, namely, essentially all flexible fabric case 11, and injection molded cassette/cassette box storage tray or insert 12, as will be more fully explained hereinafter.

Figure 1:
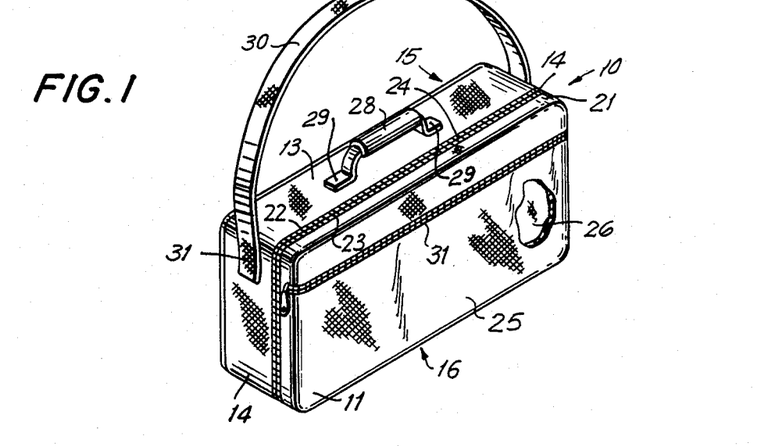
FIG. 1 is a perspective view of the carrying case in the closed position.
Figure 3:
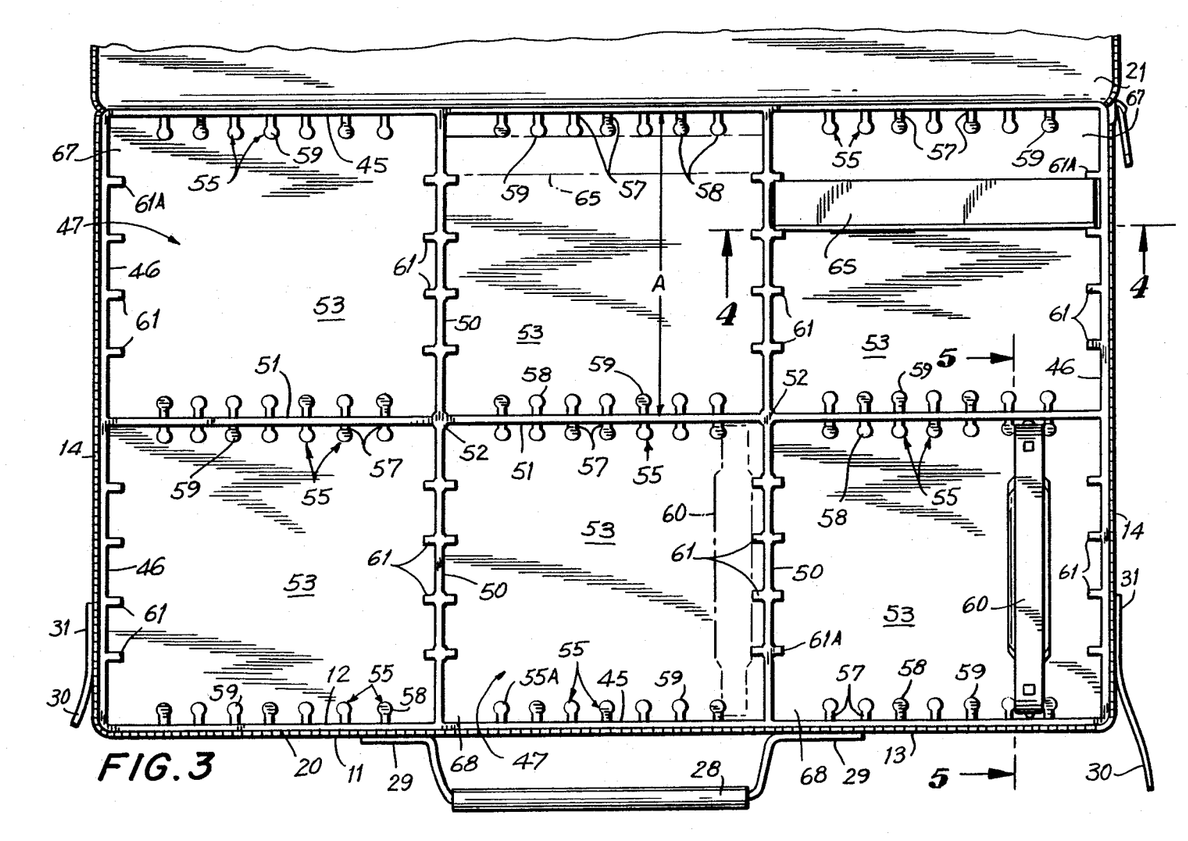
FIG. 3 is a top plan view of the case with the fabric cover fully opened, and with the storage tray insert in place.
Figure 4:
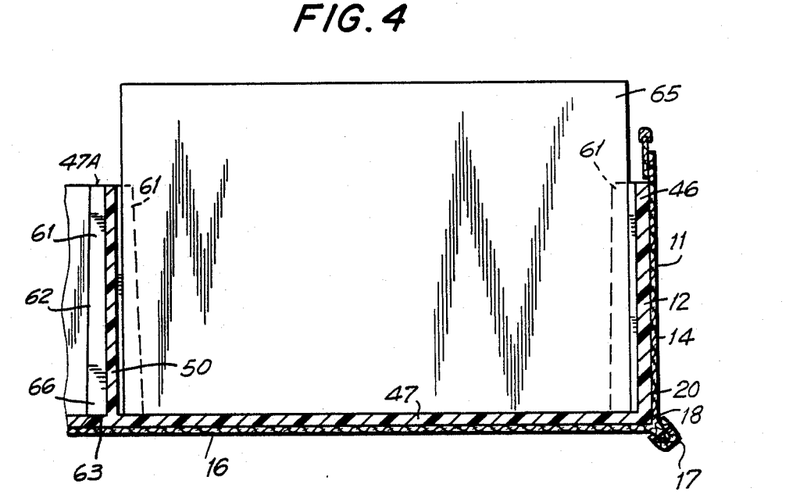
FIG. 4 is an enlarged sectional view taken along line 4—4 of FIG. 3.

Case 11 is formed of contiguous front wall 13, side walls 14, rear wall 15 and bottom wall 16. Welting 17 interconnects the peripheral edge of bottom wall 16 to the bottom edge 18 of walls 13-15 so as to form a rectilinear recess 20 for receiving tray 12. Rear wall 15 extends foreward to form outer cover 21 which cover extends to walls 13 and 14 to form edge 22 which opposes wall edge 23. Edges 22 and 23 are provided with zipper 24 for selective closure of the case. Inner flexible fabric piece 25 is stitched to cover 21 so as to form auxiliary pocket 26 which is selectively opened by zipper 31 extending transversely across cover 21.

Figure 6:
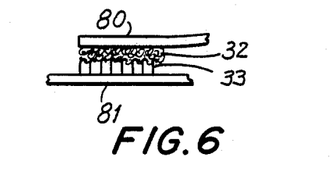
FIG. 6 is a detail sectional view of an alternate embodiment showing the carrying strap as being removable.

A handle 28 is secured to front wall 13 by stitching 29 or like means, and a shoulder strap 30 is secured to sides 14 by stitching 31 (FIG. 3) or by opposed inter-engaged Velcro pads 32 and 33 (FIG. 6), which pads are stitched respectively to the strap 80 and case side 81.

Figure 2:
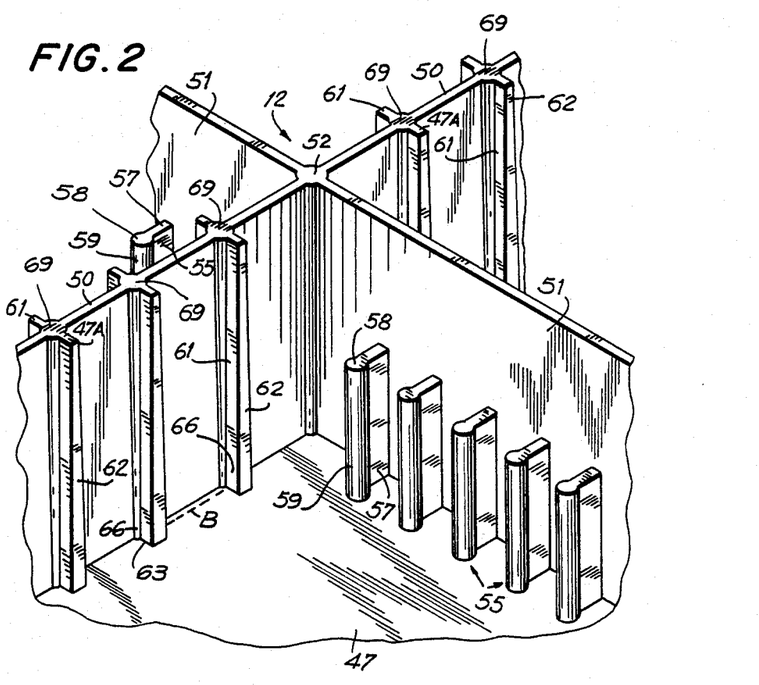
FIG. 2 is an enlarged perspective view of the interior partitions or walls and ribbing construction of the injection molded cassette storage tray insert.

The second major construction element is molded unitary construction cassette storage member or tray 12. Tray 12 is formed of elongated opposed side walls 45 and shorter opposed side walls 46 integrally connected to and with bottom wall 47. Two inner partitions or walls 50 interconnect walls 45, and one elongated inner partition or wall 51 interconnects walls 46, and inner walls 50 and 51 are in turn interconnected by cylindrical posts 52. By this manner of construction, an elongated, inner wall reinforced, relatively large, self-supporting and durable cassette storage tray is formed, with six separate box-like storage compartments 53.

Figure 5:
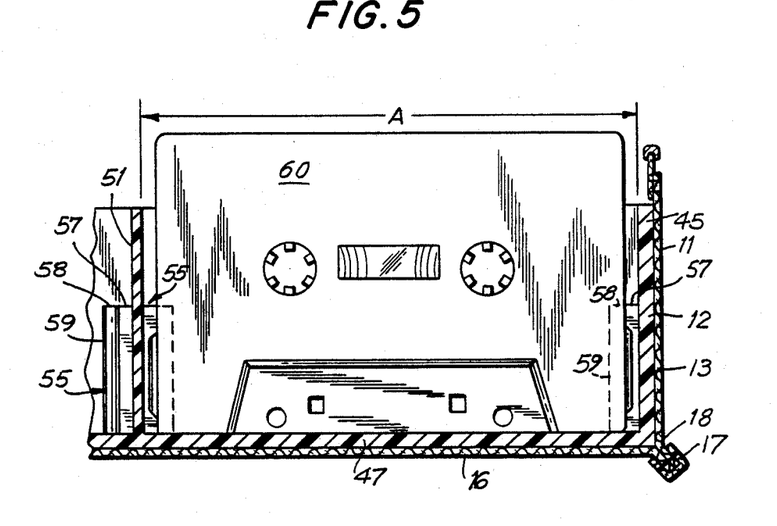
FIG. 5 is an enlarged sectional view taken along line 5—5 of FIG. 3.

A plurality of spaced parallel ribs 55 are formed on the inside of each elongated side wall 45, as well as on opposite sides of elongated inner partition or wall 51, so that facingly disposed pairs of ribs 55 are present in each compartment. Each rib 55 is formed with inwardly extending shank portion 57 and a part-cylindrical end portion 58 so as to provide curvilinear outer surface 59. The minimal distance between surfaces 59 of adjacent ribs 55 is spaced so that surfaces 59 slidably engage the sides of unboxed cassette 60, as best shown in FIGS. 3 and 5, so as to hold cassette 60 in an upright manner. The distance A between opposed walls is about equal to the overall length of cassette 60.

A second plurality of spaced ribs 61 is formed on the inside of side walls 46 and on the opposite sides of inner partitions or walls 50 so as to form pairs of opposed ribs 61 in each compartment 53. Each rib 61 extends from bottom wall 47 to top edge 47A and is upwardly tapered as at 62 so that the space between adjacent rib base portions 63 is about equal to the thickness of box 65, and the distance B between opposite wall base portions 66 (e.g. broken line FIG. 2) is approximately equal to the length of box 65. It is to be noted that ribs 61 and ribs 55 are disposed at 90° to each other. The clear plastic box 65 contains or holds a cassette, not shown.

It also is to be noted that end space 67 is formed between the last rib (e.g. 61A) and the immediately adjacent row of ribs 55, so that five boxes 65 can be stored in each compartment 53. It is also to be noted that cassette receiving end space 68 is formed between the last rib (e.g. 55A) and the immediately adjacent row of ribs 61, so that approximately eight unboxed cassettes may be stored in each compartment 53. The tray may thus receive up to thirty boxes or up to forty-eight unboxed cassettes, with each compartment being dedicated at any one time to either boxed or unboxed cassettes. A post 69 is furnished at the base of each rib 61.

The combination of cylindrical posts at 52 and ribs 55, with the rectilinear inner walls 50, 51 and ribs 61, provides an aesthetically desirable effect.

In use, tray 12 is grippingly frictionally received along insides of fabric side walls 14 and 13 and abuts the bottom fabric wall 16. When so inserted, the tray/fabric case construction is self-supporting and durable, and with tray 12 removed from case 11, the tray 12 separately functions as a cassette/box storage tray, while separate fabric case 11 functions as a utility carrying case. The auxiliary pocket 26 is exemplary of the dual functions of the case, since the flexible fabric case 11, when separated from the tray 12, functions a a utility carrying case with two compartments, namely the pocket 26 and the main inner space previously filled with the storage tray 12, characterized supra as the rectilinear recess 20. The pocket 26 is advantageous as providing added utility to the case, when separated from the tray, because in that event the pocket may contain something different from what is present in the rectilinear recess 20.

The plastic of which the tray is composed may be a thermoplastic plastic such as polyethylene; polypropylene, especially isotactic polypropylene; polystyrene; acrylics such as polymethyl methacrylate; polyvinyl chloride; polyoxymethylene; cellulosics; or nylon (a polyamide). Alternatively, the plastic may be a thermosetting plastic such as rea-formaldehyde resin; expoxy resin; melamine or rea-melamine resin; and phenolics such as phenoxyresin. The fiber or fabric of which the cover case is composed may be woven nylon, rayon, cotton, wool, flax, linen, silk, polyester, blends of these materials, etc.

Variations and modifications will be apparent to one skilled in the art, and the claims are intended to cover all variations and modifications that fall within the spirit and scope of the invention.

It thus will be seen that there is provided a multiple use cassette carrying case which attains the various objects of the invention and which is well adapted for the conditions of practical use. As numerous alternatives within the scope of the present invention will occur to those skilled in the art, besides those alternatives, embodiments, variations and equivalents mentioned supra and shown in the drawings, it will be understood that the invention is not to be limited to such alternatives or the like, but extends fully to all such equivalents, and is to be limited only by the scope of the appended claims, and functional and structural equivalents thereof.

What is claimed is:

1. A multiple use cassette carrying case comprising; a fabric case having a bottom wall and sides forming a recess, and a rigid molded plastic tray having sides and a bottom wall connecting the sides, wherein the case fabric grippingly frictionally engages the tray sides, and the tray being removably insertable in the recess, said tray being formed with means for receiving magnetic tape enclosures, whereby with the tray inserted in the case, the case is self-supporting and is useful in carrying said tape enclosures, and with the tray removed, the case is useful for carrying other objects in the recess, and the removed tray is independently useful for magnetic tape enclosure storage, said fabric case further comprising a fabric cover integrally formed with one fabric side, and further comprising a piece and means to connect the piece to the fabric cover, and said cover being formed with an opening so that the cover and second piece form a pocket and further comprising a zipper for closing the pocket, whereby with the tray inserted there is magnetic tape enclosure storage in the tray and a multiple use pocket, and with the tray removed, there is a recess and a pocket for multiple use and a separate tray for independent magnetic tape enclosure storage.

2. The carrying case of claim 1, said tray comprising an inner wall extending from the inside of one side wall to the inside of another side wall.

3. The carrying case of claim 2, further comprising a plurality of transverse walls disposed at 90° to each other so as to form pairs of opposed inner walls.

4. The carrying case of claim 3, said opposed inner walls comprising ribs, and wherein first opposed pairs of adjacent ribs are spaced so as to receive an unboxed cassette, and second opposed pairs of adjacent ribs are spaced so as to receive a boxed cassette.

5. The carrying case of claim 4, said first ribs being formed with radially outwardly extending curved ends to engage the sides of the cassette.

6. The carrying case of claim 5, said second ribs being upwardly tapered so that the space between the adjacent ribs at the bottom wall slidably receives the sides of the cassette box.

7. The carrying case of claim 1, further comprising rectangularly-shaped welting at and between the case bottom wall and sides to provide a rectilinear recess, ad said tray being rectilinear.

8. The carrying case of claim 1, said cover and sides being formed with a zipper for closing the case.

9. The carrying case of claim 4, wherein one set of opposed fabric and tray sides is substantially longer than the second opposed fabric and tray sides to form a elongated structure and wherein the inner walls support the elongated structure, and said inner walls form a plurality of box-like compartments.

10. The carrying case of claim 9, said ribs forming spaces for up to 5 cassette boxes and up to 8 unboxed cassettes in each box-like compartment.

11. The carrying case of claim 1, wherein the fabric case consists essentially fo a flexible fabric material, and the carrying case is free of stiffening or supporting materials.

12. The carrying case of claim 11, wherein the fabric is washable.

13. The carrying case of claim 1, further comprising a strap, said strap being connected to sides of the fabric case.

14. The carrying case of claim 13, further comprising means to disconnectably connect the strap to the case.

15. A multiple use rectangular parallelepiped cassette carrying case comprising, a hollow fabric cover case and an inner rigid molded plastic tray, said case having a generally rectangular bottom wall and rectangular side walls, said case bottom wall and side walls forming a recess, said tray having a bottom wall and side walls, so that the tray is removably insertable into the recess in said case wherein the fabric case consists essentially of a flexible fabric material, said fabric case being free of stiffening or supporting materials, with the flexible fabric of said case grippingly frictionally engaging the side walls of said tray, the inner surfaces of the side walls of said tray being provided with a first plurality of integral protruding ribs, at least one integral inner partition within said tray, said partition extending upwards perpendicular to the bottom wall of said tray and in registration with and spaced from at least one side wall of said tray, said partition being provided with a second plurality of ribs being rectilinear and extending upwards perpendicular to the bottom wall of said tray, said fabric case further comprising a fabric cover integrally formed with one fabric piece, and means to connect the second fabric piece to the fabric side, said fabric side being formed with an opening, so that said fabric side and said second fabric piece form a pocket, and further including a zipper for closing the pocket, whereby with the tray inserted there is a magnetic tape enclosure storage in the tray and a multiple use pocket, and with the tray removed, there is a recess and a pocket for multiple use and a separate tray for independent magnetic tape enclosure storage.

16. The cassette carrying case of claim 15, in which a plurality of inner partitions is provided within the tray, at least two of the inner partitions being disposed perpendicular to each other, so as to form pairs of opposed inner walls.

17. The cassette carrying case of claim 16, in which first opposed pairs of adjacent ribs are spaced so as to receive an unboxed cassette, and second opposed pairs of adjacent ribs are spaced so as to receive a boxed cassette.

18. The cassette carrying case of claim 17, in which the first ribs are formed with radially outwardly extending curved ends, to engage the sides of the unboxed cassette.

19. The cassette carrying case of claim 17, in which the second ribs are formed with an upwardly extending taper, so that the the space between adjacent second ribs at the bottom wall slidably receives the sides of the boxed cassette.

20. The cassette carrying case of claim 15, in which the case is form with a zippered closure.

21. The cassette carrying case of claim 16, in which a first set of opposed fabric case and tray sides is substantially longer than the second set of opposed fabric case and tray sides, so that an elongated structure is formed, and in which the inner partitions support the elongated structure, the inner partitions forming a plurality of box-like compartments.

22. The cassette carrying case of claim 15, further comprising a strap, said strap being connected to sides of the fabric case, together with means to disconnectably connect said strap to the case.

23. The cassette carrying case of claim 18, in which the first ribs terminate short of the top of the partition.

24. The cassette carrying case of claim 15, in which each of the second ribs is attached to the partition by a rectilinear cylindrical post formed at the base of the second rib.

25. The cassette carrying case of claim 20, in which at least two of the partitions are transverse and perpendicular to each other, and a rectilinear cylindrical post is formed at the junction of said two partitions.

26. The carrying case of claim 1, said pocket zipper being disposed on said fabric cover.

* * * * *

/ REEXAMINATION CERTIFICATE (2317th)

United States Patent [19]

Mastronardo

[11] B1 4,838,421

[45] Certificate Issued Jun. 14, 1994

[54] MULTIPLE USE CASSETTE CARRYING CASE

[75] Inventor: Patrick Mastronardo, Stamford, Conn.

[73] Assignee: Lebo Peerless, Inc., Bloomfield, N.J.

Reexamination Requests:
No. 90/001,999, Apr. 11, 1990
No. 90/001,943, Feb. 21, 1990

Reexamination Certificate for:
Patent No.: 4,838,421
Issued: Jun. 13, 1989
Appl. No.: 293,568
Filed: Jan. 3, 1989

Related U.S. Application Data

[63] Continuation of Ser. No. 868,265, May 29, 1986, abandoned.

[51] Int. Cl.[5] .......................................... B65D 85/672
[52] U.S. Cl. .................................... 206/387; 190/110
[58] Field of Search .................... 206/387; 190/110; 211/40, 41

[56] References Cited

U.S. PATENT DOCUMENTS

| | | | |
|---|---|---|---|
| D. 257,650 | 12/1980 | Katz et al. | D3/71 |
| D. 257,651 | 12/1980 | Katz et al. | D3/71 |
| D. 257,652 | 12/1980 | Katz et al. | D3/71 |
| D. 273,057 | 3/1984 | Katz et al. | D3/71 |
| D. 280,266 | 8/1985 | Allen | D3/71 |
| D. 281,647 | 12/1985 | Bornes et al. | D3/71 |
| 1,951,527 | 3/1934 | Oas | 190/109 |
| 2,837,185 | 6/1958 | Guenther | 190/111 |
| 3,567,063 | 3/1971 | Kovach | 206/387 |
| 3,756,383 | 9/1973 | Kryter | 206/1 R |
| 3,830,363 | 8/1974 | Liber | 206/387 |
| 3,856,369 | 12/1974 | Commiant | 312/107 |
| 4,506,769 | 3/1985 | Franco et al. | 190/110 |

OTHER PUBLICATIONS

1984 Case Logic Promotional Literature, 1 page (Case Logic I).
Christmas 1984 National Luggage Dealer's Association Catalog, p. 9, Item G. (Case Logic II).
Apr. 1985 issue of Road & Track Magazine, Case Logic advertisement in lower right hand corner of p. 207.
Christmas 1984 National Luggage Dealer's Association catalog, p. 3, Items C, D, and E.
Christmas 1984 National Luggage Dealer's Association catalog p. 9, Items E and F.
Christmas 1984 National Luggage Dealer's Association catalog, p. 11, Item A.
Christmas 1984 National Luggage Dealer's Association catalog, p. 27, Item Hartman Luggage in lower right hand corner.

*Primary Examiner*—Joseph Man-Fu Moy

[57] ABSTRACT

A multiple use cassette carrying case has an injection molded rigid cassette tray which is grippingly received in a rectilinear recess formed in a flexible case, with the fabric case cover zipper enclosing the tray in the carrying case. The cassette carrying case is a durable, self-supporting construction, without the need for stiffening and supporting materials. With the tray removed from fabric case serves as a utility case and the tray is an independent cassette storage tray. The tray is designed for large volume storage of both foxed and unboxed cassettes. The tray features inner partitions, and ribs for the mounting of either boxed or unboxed cassettes in box-like compartments. The cassette carrying case is useful for the storage of either audio or video cassettes, or other types of cassettes, i.e. magnetic tape enclosures in general.

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1-26 are cancelled.

New claims 27, 28, 29 and 30 are added and determined to be patentable.

27. *A multiple use cassette carrying case comprising; a fabric case having a bottom wall and sides forming a recess, and a rigid molded plastic tray having sides and a bottom wall connecting the sides, with said plastic tray being configured so that the case fabric grippingly frictionally engages the tray sides when the tray is positioned within the recess formed by the fabric case, with the tray being readily removable from the recess,*

*said tray being formed with means for receiving magnetic tape enclosures, whereby with the tray positioned in the recess in the fabric case, the carrying case is self-supporting and is useful in carrying said tape enclosures, and with the tray removed from the recess, the fabric case is useful for carrying other objects in the recess and the removed tray is independently useful for magnetic tape enclosure storage,*

*said fabric case further comprising a movable fabric cover connected to one case side for opening and closing the recess, said cover being integrally formed with one fabric side,*

*and further comprising an additional material piece extending substantially across said fabric cover, said additional material piece being disposed between the cover and the recess,*

*and means to connect the said additional material piece to the fabric cover so that the cover and said additional material piece form a pocket,*

*said cover having side portions which are adjacent to the case sides with the case closed,*

*said fabric cover having an opening formed therein with said opening extending across said fabric cover and said cover side portions to provide access through said fabric cover to the pocket so as to provide an in depth in cover utility pocket,*

*and further comprising a zipper for closing the opening providing access to the pocket,*

*whereby with the tray positioned in the recess formed by the fabric case, the carrying case provides a closable magnetic tape enclosure storage space provided by the tray and a closable multiple use space provided by the utility pocket, and with the tray removed from the recess, the fabric case provides both a separately closable recess and a utility pocket for multiple use and the then separate tray provides for magnetic tape enclosure storage independent of the fabric case.*

28. *The cassette carrying case of claim 27, said cover side portions comprising two side portions and said zipper extending to the side portions.*

29. *A multiple use cassette carrying case comprising; a fabric case having a bottom wall and sides forming a recess, and a rigid molded plastic tray having sides and a bottom wall connecting the sides, with said plastic tray being configured so that the case fabric grippingly frictionally engages the tray sides when the tray is positioned within the recess formed by the fabric case, with the tray being readily removable from the recess,*

*said tray being formed with means for receiving magnetic tape enclosures, whereby with the tray positioned in the recess in the fabric case, the carrying case is self-supporting and is useful in carrying said tape enclosures, and with the tray removed from the recess, the fabric case is useful for carying other objects in the recess and the removed tray is independently useful for magnetic tape enclosure storage,*

*said fabric case further comprising a movable fabric cover connected to one case side for opening and closing the recess, said cover being integrally formed with one fabric side,*

*and further comprising an additional material piece extending substantially across said fabric cover, said additional material piece being disposed between the cover and the recess,*

*and means to connect the said additional material piece to the fabric cover so that the cover and said additional material piece form a pocket,*

*said fabric cover having an opening formed therein with said opening extending sufficiently across said fabric cover to provide access through said fabric cover to the pocket so as to provide an in cover utility pocket,*

*and further comprising a zipper for closing the opening providing access to the pocket,*

*said cover having a front portion and three side portions, said cover side portions being disposed adjacent to respective case sides with the cover closing the recess,*

*said cover opening being formed in and extending across the front portion and extending into two oppositely disposed cover side portions,*

*whereby with the tray positioned in the recess formed by the fabric case, the carrying case provides a closable magnetic tape enclosure storage space provided by the tray and a closable multiple use space provided by the utility pocket, and with the tray removed from the recess, the fabric case provides both a separately closable recess and a utility pocket for multiple use and the then separate tray provides for magnetic tape enclosure storage independent of the fabric case.*

30. *A multiple use cassette carrying case comprising; a fabric case having a bottom wall and sides forming a recess, and a rigid molded plastic tray having sides and a bottom wall connecting the sides, with said plastic tray being configured so that the case fabric grippingly frictionally engages the tray sides when the tray is positioned within the recess formed by the fabric case, with the tray being readily removable from the recess,*

*said tray being formed with means for receiving magnetic tape enclosures, whereby with the tray positioned in the recess in the fabric case, the carrying case is self-supporting and is useful in carrying said tape enclosures, and with the tray removed from the recess, the fabric case is useful for carrying other objects in the recess and the removed tray is independently useful for magnetic tape enclosure storage,* said fabric case further comprising a movable fabric cover connected to one case side for opening and closing the recess, said cover being integrally formed with one fabric side, said cover having a front portion and three side portions, said cover side portions being disposed adjacent to respective case sides with the cover closing the recess, and further comprising an additional material piece extending substantially across said fabric cover, said additional material piece being disposed between the cover and the recess, and means to connect the said additional material piece to the fabric cover so that the cover and said additional material piece form a pocket disposed behind the front portion and adjacent the side portions to form an in depth in cover utility pocket, said fabric cover having an opening formed therein with said opening extending sufficiently across said fabric cover to provide access through said fabric cover to the pocket said cover opening being formed in and extending across the front portion and extending into two oppositely disposed cover side portions, and further comprising a zipper for closing the opening providing access to the pocket, whereby with the tray positioned in the recess formed by the fabric case, the carrying case provides a closable magnetic tape enclosure storage space provided by the tray and a closable multiple use space provided by the utility pocket, and the tray removed from the recess, the fabric case provides both a separately closable recess and a utility pocket for multiple use and the then separate tray provides for magnetic tape enclosure storage independent of the fabric case.

* * * * *